United States Patent [19]
Guyot

[11] 3,723,869
[45] Mar. 27, 1973

[54] DEVICES FOR CARRYING OUT SPECTRAL ANALYSIS

[75] Inventor: Joel Guyot, Paris France
[73] Assignee: Thomson-CSF, Paris, France
[22] Filed: Feb. 4, 1972
[21] Appl. No.: 223,613

[30] Foreign Application Priority Data

Feb. 5, 1971 France..................................7103963

[52] U.S. Cl. ...............................................324/77 B
[51] Int. Cl. ............................................G01r 23/16
[58] Field of Search..324/77 B, 77 D, 77 R; 307/269, 307/271; 328/37, 53, 58

[56] References Cited

UNITED STATES PATENTS 3,634,759  1/1972  Koshikawa et al..................324/77 B Primary Examiner—Stanley T. Krawczewicz
Attorney—Edwin E. Greigg

[57] ABSTRACT

The selectivity of a spectral analysis is increased by using a factor of compression of sampled sections of an electrical signal, having a value such that the duration of each section is lengthened, and the corresponding cycle comprises a sequence of the same compressed section, the sequence amplitude-modulates the identical frequency bands distributed synchronously within one and the same cycle of a linearly frequency-modulated reference signal. The modulation product is applied to a matched dispersive delay line.

10 Claims, 7 Drawing Figures

DEVICES FOR CARRYING OUT SPECTRAL ANALYSIS

The present invention relates generally to improvements in methods and apparatus for carrying out spectral analysis of electrical signals and in particular to methods and apparatus for carrying out real-time spectral analysis, that is, methods and apparatus which are capable of producing at the end of a time interval $T_o$ and with a resolution equal to $1/T_o$, the frequency spectrum of a section of duration $T_o$ of an electrical signal. The term "resolution" is used herein as a synonym for selectivity, and refers to the ability of the spectrum analyzer to produce two signals of equal amplitude separated by a resolution element.

The present invention relates particularly to spectral analysis devices which comprise at the input a system for effecting time-compression of the signal sections being analyzed. The signal sections are successively sampled and quantized, and fed to a buffer store and converted at the output into an analog signal, the duration of which is compressed in accordance with a selective time-compression factor. The compression factor is equal to the ratio between the frequency of read-out of the samples contained in the store and the frequency of sampling of the input signal.

Various embodiments of such devices are known. For example, one form of a known spectral analyzer is described on pages 528–530 of the article by P. Tournois and J. Bertheas entitled "Use of Dispersive Delay Lines for Signal Processing in Underwater Acoustics" which appeared in Vol. 46, No. 3 of 1968 of *Journal of the Acoustical Society of America*. An advantage of the devices described in this article over other known forms is that they retain real-time operation and produce the same number of spectrum lines, within a wide band of analyzed frequencies. These devices make use of techniques employing dispersive delay lines for time-compression of the sections of input signal and of matched filtering of the signal resulting from the amplitude modulation by the input signal of a linearly frequency-modulated reference signal.

It can be shown that if the dispersive delay line has a linear variation in delay time $T_1$, within a frequency band of bandwidth $B_1$, optimum operation of these devices is obtained when the input signal sections are time-compressed by a compression factor $K$ such that their initial duration $T_o$ becomes equal to $T_1/2$, two successive compressed sections being furthermore separated by one and the same duration $T_1/2$ in order to eliminate the parasitic spectrum lines which are due to secondary lobes. This compression factor $K$ is a positive whole number which depends upon the bandwidth $B_o$ of the input signal: $K = B_1/2B_o = 2T_o/T_1$. The time-compression effected thus makes it possible to match the analyzer to the bandwidth $B_o$ of the input signal. The duration $T_o$ of these signal sections itself is dependent upon the bandwidth and is equal to $T_o = (B_1/4B_o)T_1$. Following this time-compression, the input signal sections may be applied to an input of a heterodyne circuit and amplitude modulate the signal of duration $T_1/2$ which is linearly frequency-modulated through a sweep of $B_1/2$.

These analyzers have a selectivity, after constant time-compression, equal to $2/T_1$ and thus furnish a constant number N of spectrum lines equivalent to the ratio between the analyzed bandwith $B_1/2$ after time-compression, and said selectivity, that is to say to $N = B_1T_14$. The maximum bandwidths which they can analyze in real time is equal to $Bo_{Max} = B_1/4$, the compression factor than being equal to 2.

One object of the present invention is to improve these devices in such a fashion as to increase their selectivity by a factor or $n$, that is to say, to increase the number of spectrum lines which they furnish in the real-time context, while operating within bandwidths identical to those of the aforementioned devices, $n$ furthermore being a positive whole number.

In accordance with the present invention, the time-compression factor $K$ of the input signal sections being analyzed is made $n$ times greater than that utilized in the aforesaid prior art. That is to say, $K = n \ (B_1/2B_o)$, the duration $T_o$ of these input signal sections itself becoming $n$ times longer, such that $T_o = n(B_1/4B_o)T_1$.

In addition, in order to obtain the product of the modulation of each of the $n$ identical time-compressed sections of the signal being analyzed by a linearly frequency-modulated reference signal, which signals are simultaneously applied to the heterodyne circuit, the reference signal is produced in accordance with the invention by an oscillator of controlled frequency and comprises identical frequency bands $B_1/2$ which are distributed in equal number $n$ and in synchronism with said sections within a cycle of sequences of periodicity advantageously equal to $n\,T_1$.

Other features and advantages of the present invention will become apparent during the course of the ensuing description, which is given by way of non-limitative example making reference to the attached figures in which:

FIGS. 2 and 3 are amplitude/time diagrams and frequency/time diagrams, respectively, relating to signals prior to modulation, such as obtained and utilized in the prior art devices referred to;

Figure 1:
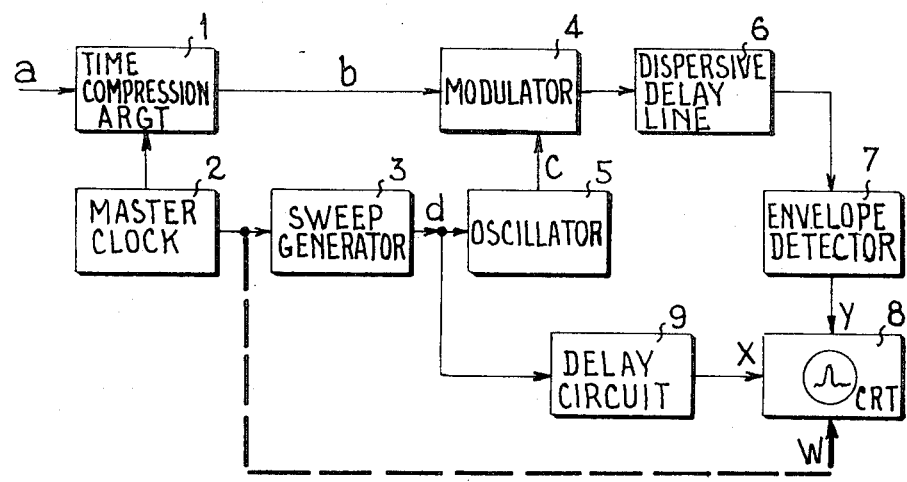
FIG. 1 is a schematic diagram of a spectral analysis device utilized in the present invention, whose configuration is similar to the known designs.

Referring now to the drawings, and in particular to the schematic diagram of FIG. 1, there is illustrated a spectral analysis device which has a configuration similar to that of the devices aforementioned in the context of the prior art. The input signal $a$ being analyzed passes through a time-compression system 1 by which it is modified to form a signal $b$. Signal $b$ is applied to a modulator 4 to which is also supplied a signal $c$ from a frequency controlled oscillator 5. The modulation product of signals $b$ and $c$ appears at the output of the modulator 4 and is subsequently supplied to a dispersive delay line 6, the output of which is connected to the input of an envelope detection circuit 7.

The output signal from circuit 7 comprises the desired spectrum lines which are displayed, for example, by connecting the output of the detector to the Y input of an oscilloscope 8. The Y input of the oscilloscope receives a scanning signal coming from a delay circuit 9. A master clock 2 supplies the control signals for the time-compression circuits 1, as well as those for the sweep scanning generator 3 whose output is connected simultaneously to the frequency-controlled oscillator 5 and to the delay circuit 9. The dispersive line 6 utilized exhibits a linear variation $T_1$ in its group delay, within a bandwidth of $B_1$, this band being centered on a frequency $F_1$.

In the prior art devices, optimum operation is obtained when the time-compression system 1 has a compression factor K equal to $B_1/2B_o$, $B_o$ being the bandwidth of the input signal $a$. The frequency band which can be analyzed in real-time fashion suing these devices has a maximum width of $B_{oMax}$ which is equal to $B_1/4$. The number of spectrum lines produced is constant and equal to $N = B_1T_1/4$ and the time interval required to produce these spectrum liens is equal to $T_1$.

Figure 2:
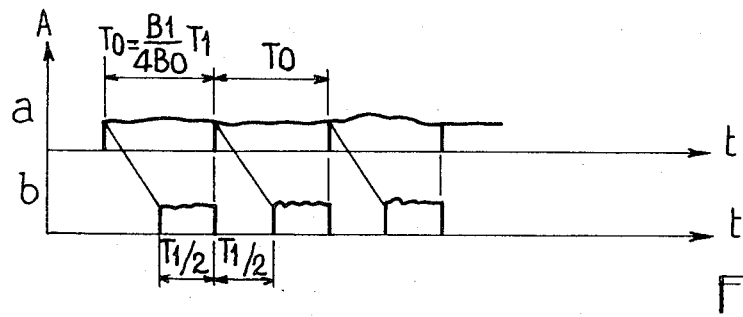
Figure 3:
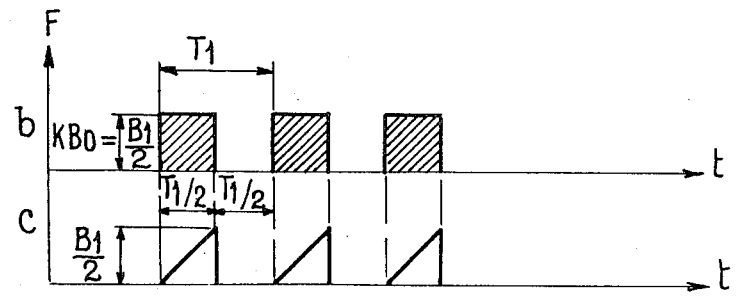

The graphs of FIGS. 2 and 3 provide an illustration of the way in which the signals are processed prior to modulation.

FIG. 2 illustrates an amplitude/time diagram relating to the input signal sections $a$ being analyzed, where the analyzed band is equal to he maximum bandwidth $B_{oMax} = B_1/4$. The signal can be analyzed in the real-time situation. This is synonymous with saying that the input signal $a$ is cut into adjacent successive sections of duration $T_1$ each. In the case where the band $B_o$ is being analyzed is lower than the maximum bandwidth $B_{oMax}$, the input signal sections a partially overlap one another. The diagram $b$ of FIG. 2, illustrates the compressed signal which is applied to the modulator 4. This signal is made up of sections of identical duration $T_1/2$. In order to avoid the appearance of spurious spectrum lines due to the interaction of secondary lobes relating to a given section with the main lobe of the adjacent section, two successive compressed sections of signal $b$ are advantageously separated by a time interval of $T_1/2$.

As the frequency/time diagram of signal $b$, illustrated in FIG. 3, shows, whatever the bandwith $B_{oMax}$ being analyzed, provided that it is less than $B_{oMax} = B_1/4$, the modulator 4 will receive from the time-compression system 1, compressed signal sections of duration $T_1/2$ each, spaced at $T_1/2$, and this within a bandwidth equal to $KB_o = B_1/2$.

The signal c illustrated in the bottom part of FIG. 3 and which is also supplied to the modulator 4 from the frequency controlled oscillator 5, is linearly frequency-modulated through a bandwidth of $B_1/2$. The result is that each scanning operation of the oscillator 5 enables the complete analysis of an input signal section. The number of spectrum lines produced by these analyzers is constant whatever the analyzed band, should the latter be quite wide, the number of lines may turn out to be insufficient.

In accordance with the present invention, the number of spectrum lines is increased in the ratio of $n$, $n$ being a positive whole number, by making the time compression factor K, $n$ times higher than the value $B_1/2B_o$ utilized in the prior art, and by correlatively chopping the input section $a$ into sections of duration $n$ times greater than $(B_1/4B_o)T_1$. To this end, as in the prior art embodiments, the time-compression system 1 is provided with a buffer store in which the duration of the signal is compressed. At the end of a circulation of the quantized samples in the time-compression store of the system, the signal $b_o$ which is obtained is made up of compressed sections, of duration $T_1/2$ each, appearing at time intervals of $T_o = n(B_1/4B_o)T_1$.

In accordance with the present invention, the number of circulations of one and the same compressed input signal section in the time-compression store is made equal to $n$. The modulator 4 thus receives a compressed section of duration $T_1/2$ $n$ successive times in a sequence comprised within a cycle of periodicity $nT1$, this at intervals of $T_1$, as shown by the amplitude/time diagrams of FIG. 4.

Figure 6:
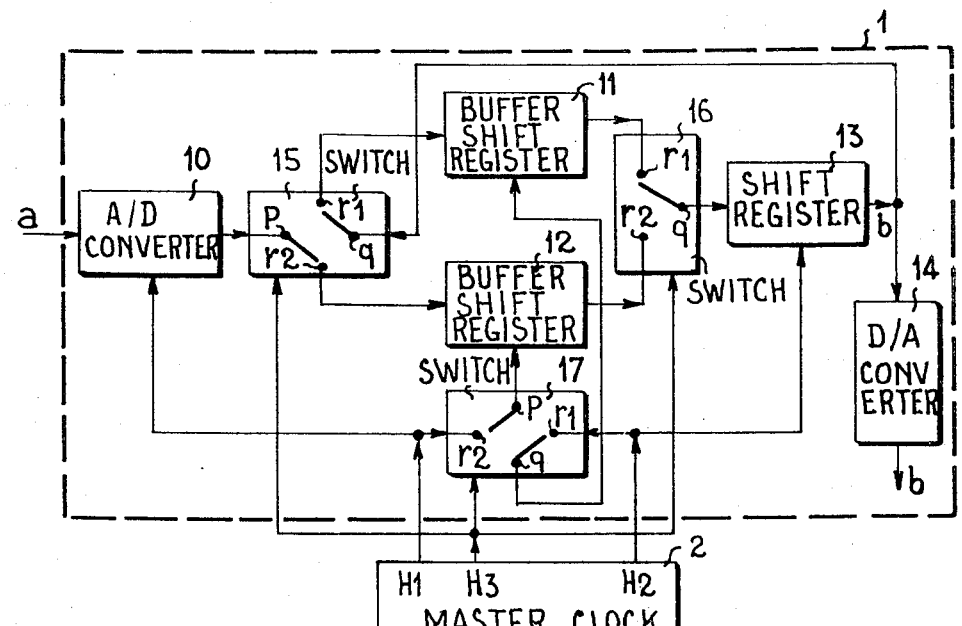
FIG. 6 is a schematic diagram of the time-compression system of the present invention corresponding to the time compression block in the system shown in FIG. 1.

This sequence is obtained by means of a time-compression system 1, advantageously of digital type, shown in greater detail in FIG. 6. An analog-digital converter 10 controlled by a signal $H_1$ coming from a master clock 2, effects sampling and quantizing of the input signal $a$. The frequency of the clock signal $H_1$ is advantageously made more than twice the bandwith $B_o$ of the input signal in order to satisfy the condition defined by Shannon's sampling theory. The output of the converter 10 is connected to the input terminal $p$ of a double-register input switch 15 and through the switch to one or the other of the output terminals $r_1$ and $r_2$ of the switch. The output terminal $r_1$ is connected to the input of a buffer store 11 of the shift-register type, whose output is connected to an input terminal $r_1$ of a single changeover switch 16. The output terminal $r_2$ is connected to the input of another buffer store 12 whose output is connected to input terminal $r_2$ of switch 16. The output terminal $q$ of the switch 16 is connected to the input of a shift-register 13. Register 13 has its output terminal connected to a digital-analog converter 14 that supplies the time-compressed signals $b$, and also to the second input $q$ of the input switch 15.

Figure 4:
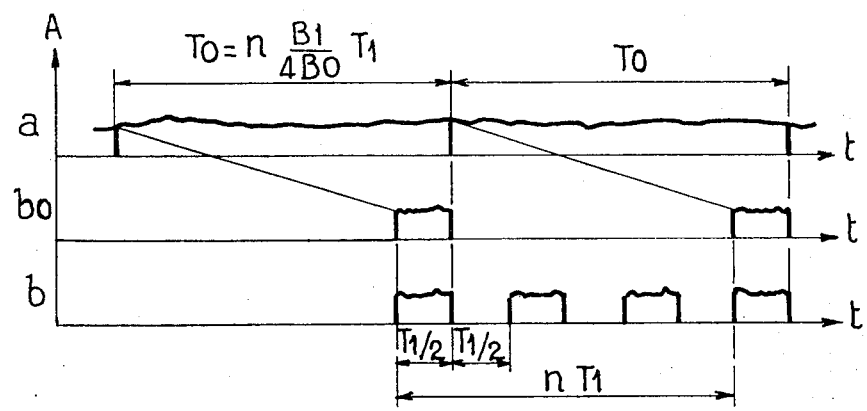
FIGS. 4 and 5 are amplitude/time and frequency/time diagrams, respectively, of signals prior to modulation, of the kind obtained and utilized in the device in accordance with the present invention.

The shifting of information through the register 13 is controlled by a clock signal $H_2$ produced by the master clock 2. The frequency of this clock signal $H_2$ is made K times higher than that of the sampling signal $H_1$ so that each section of input signal $a$ experiences a time-compression in the ratio K. One and the same time-compressed section circulates $n$ successive times through a loop comprising the register 13 and one or the other of the two buffer stores 11 and 12, depending upon whether the inputs $q$ of the switches 15 and 16 are switched to the position $r_1$ or $r_2$. As the amplitude/time diagrams of FIG. 4 show, the signal b which the modulator 4 receives from the time compression arrangement is consequently made up of sequences of $n$ identical sections each of duration $T_1/2$, advantageously separated by time intervals which themselves are also equal to $T_1/2$.

While the compressed signal section is circulating in this fashion in the aforedefined loop comprising the register 11 or 12, the samples of the next section commence to be stored in the buffer store 12 or 11 which is available in accordance with the frequency of the clock signal $H_1$. At the end of the time $nT_1$ of the cycle, the function of the buffer stores is reversed. The switching of the control signals applied to these buffer stores 11 and 12 with each sequential cycle of one and the same section, is effected by a double-switch 17 whose input terminals $r_1$ and $r_2$ are respectively supplied with the signals $H_2$ and $H_1$ and whose output terminals $p$ and $q$ control the shift function of the respective buffer registers 12 and 11. A signal $H_3$ produced by the master clock 2, whose periodicity is equal to that $nT_1$ of the sequence cycle, controls the connection established by the switches 15, 16 and 17.

As far as the capacity of each of the shift registers 11, 12 and 13 is concerned, it is proportional to $2.5\ n\ B_oT_1$ in the case of each of the buffer registers 11 and 12 and to $2.5\ n\ B_1T_1(¼ - B_o/B_1)$ in the case of the register 13, it being assumed that frequency of the sampling signal $H_1$ is equal to $2.5\ B_o$.

Figure 5:
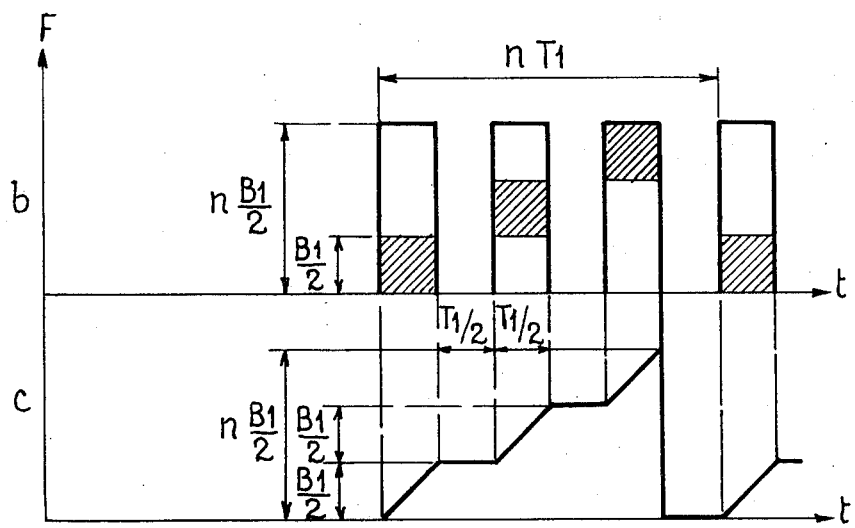

FIG. 5 illustrates the frequency/time diagrams of the signals $b$ and $c$ which the modulator 4 respectively receives from the time-compression system and the frequency-controlled oscillator 5.

The bandwidth $KB_o$ of the time-compressed signal $b$ is equal to $n\ (B_1/2)$. As far as the signal $c$ is concerned, its total bandwidth is also equal to $n\ B_1/2$ but, being of stepped wave form, it is made up of $n$ successive inclined steps each with a duration $T_1/2$ and a bandwidth $B_1/2$. As shown, successive steps are separated by a dwell of duration $T_1/2$ and have juxtaposed bands. As shown in FIG. 5, each cross-hatched part of the diagram $b$ is synchronous with a step in the linearly frequency-modulated signals $c$, so that the dispersive delay line 6 is able to analyze the portion $B_1/2$ of the bandwidth $n\ (B_1/2)$ of the compressed signal $b$. The number of spectrum lines obtained in respect of each portion is equal to $N = B_1T_1/4$, this meaning that there is a total of $n\ N = n\ (B_1T_1/4)$ spectrum lines obtained for the overall bandwidth $B_o$ of a section of the input signal $a$. Thus, the selectivity of this analyzer has been increased by a ratio $n$, without changing the value of the maximum bandwidth $B_{oMax} = B_1/4$ which can be analyzed in real time by the device in accordance with the invention.

Figure 7:
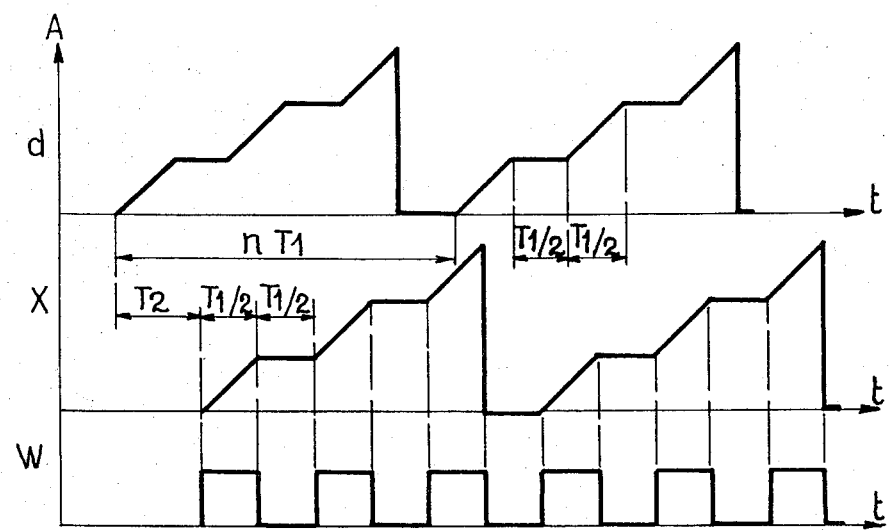
FIG. 7 illustrates the amplitude/time diagrams of auxiliary signals applied to the display instrument for displaying the spectrum lines of the signals produced by the analyzer.

FIG. 7 illustrates the amplitude/time diagrams of the signal $d$ supplied by the scanning generator 3 to the frequency-controlled oscillator 5 and to the delay circuit 9. The signal X is obtained by transmission of the signal $d$ through the delay circuit 9. The signal W is used to control the modulating electrode of the display instrument 8 and is derived at the master clock.

The duration $T_2$ by which the start of the signal X is offset in relation to the start of the signal $d$, is equal to the mean delay of the dispersive line 6. As far as the signal W is concerned, its function is to suppress image spectra and W is a rectangular waveform signal of periodicity $T_1$. It is produced by the master clock 2 as also is the signal used to control the scanning generator 3.

The foregoing description has been given purely by way of non-limitative example. It goes without saying that it extends equally to any device which utilizes a similar analysis technique. It also includes, in particular, devices in which the input signal being analyzed is given a complex form by any known kind of modulating means, in which case each component of said signal is processed by circuits similar to those described in the foregoing, the combination of said components being effected just prior to input to the dispersive line. Thus, the maximum width of the band analyzed can be increased.

That which is claimed is:

1. A method of real-time spectral analysis of electrical signals in a system having a memory controlled by clock signals from a master clock source comprising successively utilizing time-compression, sampling and quantizing sections of an input signal having a frequency band of $B_o$ by heterodyning the compressed samples with a reference signal linearly frequency-modulated by a frequency controlled oscillator, processing the modulation product of the compressed samples and reference signal in a dispersive matched delay line exhibiting a linear variation in the group delay $T_1$ within a frequency band of $B_1$, detecting the envelope of the signal containing the N analyzed spectrum lines, wherein said sampling includes the step of selecting a time-compression factor K equal to $n\ (B_1/2B_o)$, where $n$ is a positive whole number of circulations within the memory on the part of one and the same section of compressed duration $T_1/2$ within a bandwidth $B_1/2$ such that the duration $T_o$ of each sampled section of the input signal is made equal to $n\ (B_1/4B_o)\ T_1$, distributing the sections in the total frequency band of $n\ (B_1/2)$ in a cycle of sequences of one and the same compressed section, such that the modulation product, after processing, is composed of $nN = n\ B_1T_1/4$ spectrum lines.

2. A method as set forth in claim 1, wherein said reference signal is maintained under the control of a scanning signal and is applied to the modulator of a heterodyning circuit and comprises identical frequency bands $B_1/2$ distributed in a number $n$ within its total frequency band of $n\ B_1/2$ and synchronized with said sections of said sequence.

3. A method as claimed in claim 2, wherein said scanning signal is of stepped wave form and comprises inclined steps of duration $T_1/2$ whose level varies linearly and whose number is equal to said number $n$, said steps being distributed at equal time intervals of $T_1$ and being separated by dwell periods of duration $T_1/2$.

4. A method as set forth in claim 2, wherein the control signals for the registers in the loop, for the cycle of sequences of one and the same compressed sample section, for the scanning signals and for the reference signals, have a duration equal to $nT_1$.

5. A method as claimed in claim 2, wherein the clock signals of the master clock jointly control the elements of the time-compression system in such a manner that a first control signal, at a frequency of more than double the bandwidth $B_o$ of the input signal, ensures the sampling and quantizing of said input signal and the shifting of the quantized samples alternately through one or another of two input buffer registers, a second control signal, at the frequency of the first control signal multiplied by the selected compression factor K, controls the shift function of an output register and an available one of the input registers which are connected in a loop to form a circulatory store, and a third control signal, in the rhythm of the periodicity of said cycle of sequences, effects control of the input and changeover switches, as well as of the switch controlling the registers of said loop.

6. A method as claimed in claim 5, wherein the control signals for the registers in the loop, for the cycle of sequences of one and the same compressed sample section, for the scanning signals and for the reference signals, have a duration equal to $nT_1$.

7. A method as claimed in claim 2, wherein the scanning signal controls said oscillator and the deflection voltage of a pair of plates of an oscilloscope, with a delay equal to the mean delay of said dispersive delay line; and wherein a rectangular waveform signal produced by the master clock synchronizes the scanning signal and controls the voltage on the modulating electrode of said oscilloscope.

8. A real-time spectral analysis system utilizing the techniques of time-compression of the input signal sections and of matched filtering, by means of a dispersive delay line, of the signal resulting from amplitude modulation by the input signal of a linearly frequency-modulated reference signal, and having a master clock arranged to control the elements of the time-compression system, the improvement comprising an input analog-digital converter, an output digital-analog converter, a double input switch and a single changeover switch connected between their respective output and input terminals, two buffer registers connected in parallel and arranged to be switched alternatively in the rhythm of the sequences of the compressed signal section, an output register, means for connecting one of the buffer registers to the input converter and the other buffer register in a loop with the output register through said input and changeover switches, said output register being connected to the output converter.

9. A system as claimed in claim 8, further including a double-shift switch connected to be controlled in said rhythm of the cycle of sequences, said switching of the buffer register being such that the buffer register switched to the input being connected to a clock terminal supplying a control signal at the sampling frequency, while the loop-switched registers, forming a circulatory store, are connected to another clock terminal which supplies a control signal at the sampling frequency multiplied by the selected compression factor K.

10. A system as claimed in claim 8, wherein the clock signals of the master clock jointly control elements of the time-compression system such that a first clock signal controls sampling and quantizing of the input signal and shifting of the quantized samples alternately through one or the other of said two buffer registers, a second clock signal controls the shift function of the output register and an available one of the buffer registers and a third clock signal controls the input and changeover switches.

* * * * *